United States Patent
Vazin

(10) Patent No.: US 6,473,944 B1
(45) Date of Patent: Nov. 5, 2002

(54) ONE-WAY CLUTCHING METHODS BETWEEN A LIGATURE AND A FRAME AND THEIR APPLICATIONS

(76) Inventor: Hassan Vazin, 648 Harpeth Knoll Rd. P.O. Box 218025, Nashville, TN (US) 37221-8025

(*) Notice: Subject to any disclaimer, the term of this patent is extended or adjusted under 35 U.S.C. 154(b) by 8 days.

(21) Appl. No.: 09/676,577

(22) Filed: Oct. 2, 2000

(51) Int. Cl.⁷ .......................... A43C 7/00; A44B 21/00; F16G 11/00
(52) U.S. Cl. .................. 24/129 R; 24/129 A; 24/712.1; 24/712.9; 24/713.6
(58) Field of Search .................. 24/129 R, 129 A, 24/129 B, 115 H, 66.9, 712.1, 712, 713.6, 712.9, 300, 131 C, 122.6

(56) References Cited

U.S. PATENT DOCUMENTS

| | | | | |
|---|---|---|---|---|
| 329,071 A | * | 10/1885 | Palmer | 24/129 R |
| 532,242 A | * | 1/1895 | McShane | 24/712.9 |
| 749,235 A | * | 1/1904 | Smith | 24/129 R |
| 903,240 A | * | 11/1908 | Smith | 24/129 R |
| ,987,407 A | * | 3/1911 | Scott | 24/129 R |
| 1,205,109 A | * | 11/1916 | Ratekin | 24/713.6 |
| 1,665,745 A | * | 4/1928 | Lang | 24/129 R |
| 2,932,072 A | * | 4/1960 | Pruchnow | 24/129 A |
| 3,276,083 A | * | 10/1966 | Gubash | 24/712.9 |
| 3,631,570 A | * | 1/1972 | Coleman | 24/129 R |
| 3,675,276 A | * | 7/1972 | Nuse | 24/129 B |
| 4,261,081 A | * | 4/1981 | Lott | 24/712.9 |
| 4,761,860 A | * | 8/1988 | Krauss | 24/713.6 |
| 4,899,466 A | * | 2/1990 | Skaja | 34/713.6 |
| 5,065,482 A | * | 11/1991 | Lofy | 24/712.1 |
| 5,293,675 A | * | 3/1994 | Shai | 24/712.1 |
| 5,351,367 A | * | 10/1994 | Kennedy et al. | 24/300 |

FOREIGN PATENT DOCUMENTS

| | | | | |
|---|---|---|---|---|
| CH | 0305913 | * | 3/1955 | 24/16 R |
| GB | 0342153 | * | 1/1931 | 24/712.1 |
| GB | 2028417 | * | 3/1980 | 24/129 B |

\* cited by examiner

Primary Examiner—Victor Sakran

(57) ABSTRACT

This invention discusses methods for forming an adjustable look between a ligature and a frame. Three methods of 2-Hole, 3-Hole and, Loop Turning along with their applications are discussed. Means for easy unlocking of the system are provided. Some of the many applications of the methods include usage in packaging and moving, in belt buckles, in bolts (including the scat belts), in tents pegs, in tents, in cargo covers, in convertible tops, in wearable items; including shoes clothing items, hair bows, helmets, gloves, etc., in luggage racks (including car top luggage racks). In all applications either one of the methods of forming a one-way clutching is applied directly to the body of the product or an external frame is employed to interface the product and Its ligatures The invention extends the methods to ligature ladders and other ligature ascending/descending devices as well

8 Claims, 6 Drawing Sheets

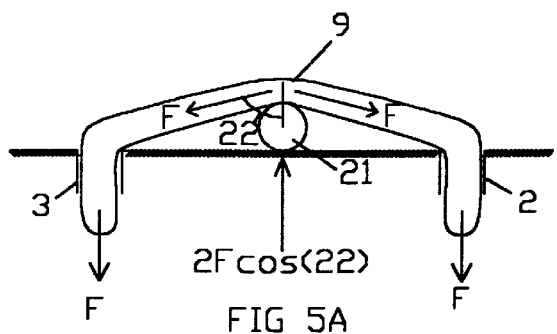
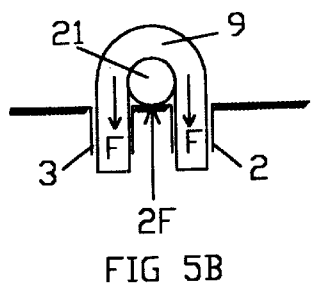
FIG 5A
FIG 5B
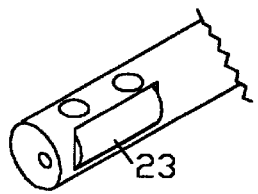
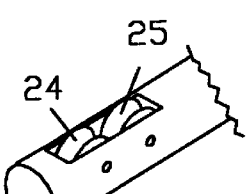
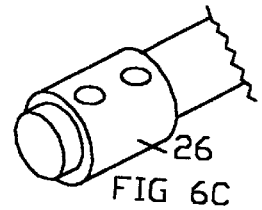
FIG 6A  FIG 6B  FIG 6C
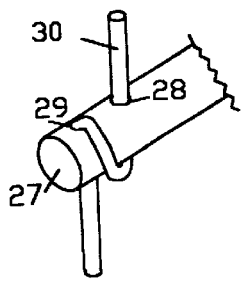
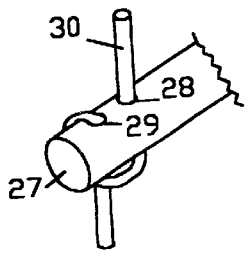
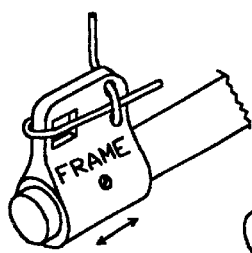
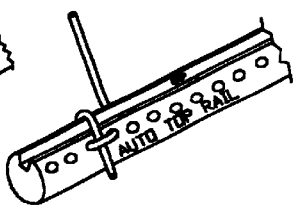
FIG 7A  FIG 7B  FIG 8A  FIG 8B
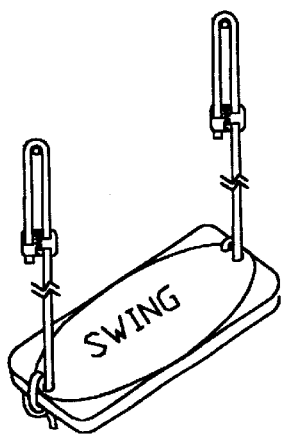
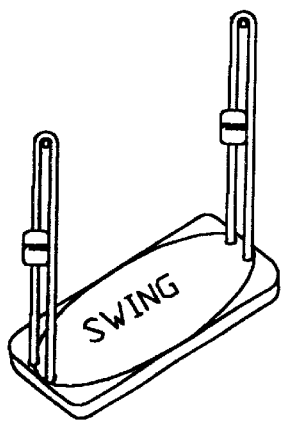
FIG 9A  FIG 9B

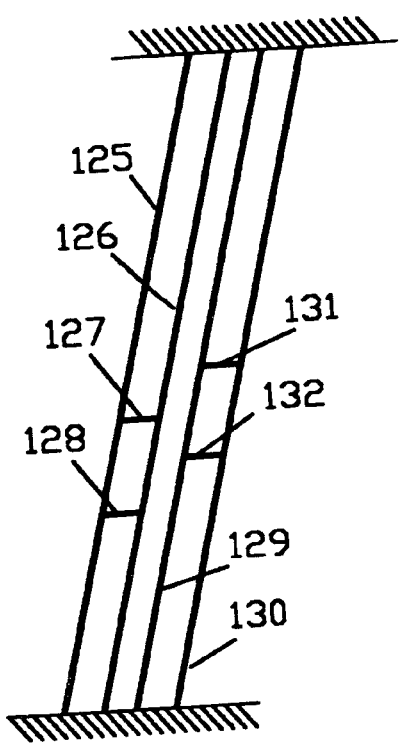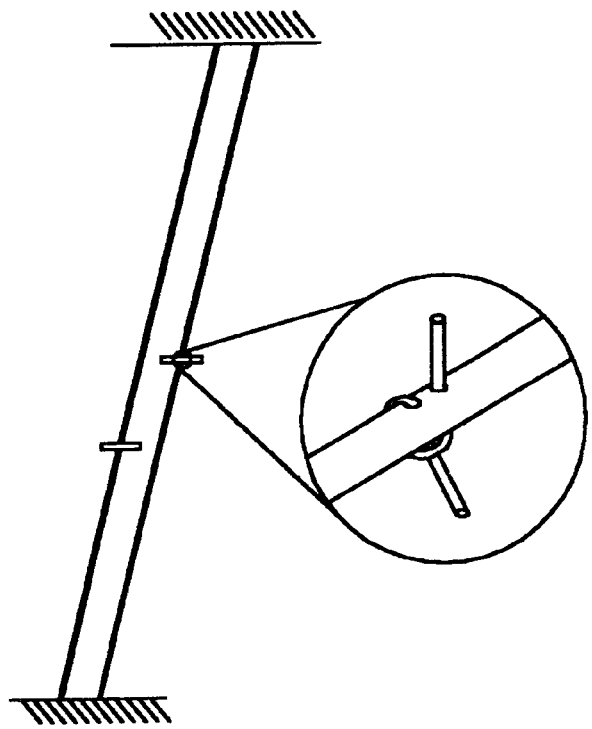
FIG 20A  FIG 20B
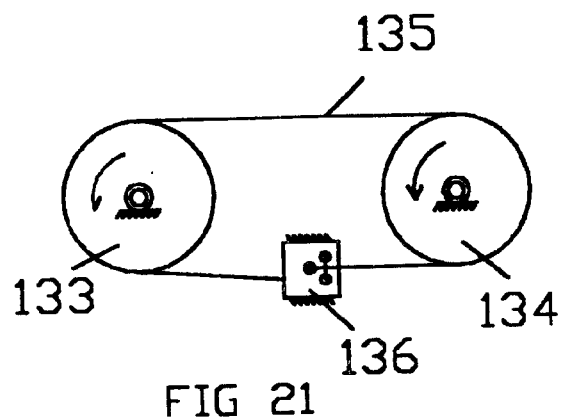
FIG 21

ONE-WAY CLUTCHING METHODS BETWEEN A LIGATURE AND A FRAME AND THEIR APPLICATIONS

BACKGROUND OF THE INVENTION

This invention centers around discovered methods of providing a one-way clutching action between a ligature and a frame and applications of the methods to specific products. The mentioned methods create a positive locking (i.e. no possible relative motion) between a ligature and a frame in only one direction and allow a free relative motion between the ligature and the frame in the opposite direction. One-way clutches, by definition, allow relative motion between two objects only in one direction and prevent any relative motion between the two objects in the opposite direction. One objective of this invention is then to discuss the discovered methods of providing a one-way clutching action between a ligature (i.e. rope, etc.) and a frame. Another objective of this invention is to explain the application of the methods of one-way clutching to new or existing products. The methods have diverse applications. Three methods for creating one-way clutching are discussed. The methods are 3-Hole Method, 2-Hole Method and, Loop-Turning Method. The products discussed in this document include wearable items (i.e. shoes, boots, clothing items, hats, helmets, hair bows, etc.), tents, cargo covers, luggage carriers, convertible tops; ligature ladders, ascending/descending devices, packaging items, seat belts, exercise devices, power transmissions, etc. In addition to providing a one-way clutching action between a ligature and a frame, the invention allows quick release or adjustments of the one-way lock between the ligature and the frame without the use of any tools. The frame, depending on the application, may be made from any rigid, elastic (or in between) material. Ligature may include ropes, straps or, wires. The ligature maybe made of metals, plastics or composite materials, etc.

SUMMARY OF THE INVENTION

The invention is based on the inventor's discovered methods of creating a one-way clutching action between a body (i.e. a frame) and another flexible body (i.e. a ligature). The term frame is to be interpreted in a broad sense. As explained below, the frame can be a new or an existing product. In general, wherever a ligature has to interact with another object this invention offers practical advantages.

The invention is based on a ligature forming a specific loop within the body of a frame. The ligature after following a path ends up passing underneath the loop. As a result, relative motion between the ligature and the frame is possible only in one direction. This principle is extended into many variations and numerous applications.

There are three ways for creating a one-way clutching action between a frame and a ligature. The methods are: 3-Hole Method, 2-Hole Method and, Loop-Turning Method. The methods are based on creating a dynamic frictional lock between two overlapping segments of the ligature. The dynamic characteristics of the system are due to the proportional increase in the frictional force, within the overlapping segments of the ligature, as a function of the applied force.

The frame in the 2-Hole Method and in the Loop-Turning Method is comprised of sets of paired holes. In the 3-Hole Method, the frame is comprised of sets of 3 holes with two of the holes in each set being paired and specifically spaced. The same applies to the 2-Hole Method where the paired holes should be spaced apart by a specific distance. If the ligature has a round cross section, the inner edge to inner edge distance between the paired holes should approximately be equal to the diameter of the ligature. If the ligature has a flat cross section, the inner edge to inner edge distance between the paired holes should not be longer than the width of the ligature. From the mechanical view point the distance between the paired holes can be critical in providing the necessary positive locking after an overlap between two segments of the ligature is established. Further, the said distance between the said two paired holes can play a role in preventing the frame from biting into the ligature. Such biting can damage the ligature. In the case of a 3-Hole Method, the third hole normally is located in such a manner that the three holes form a triangle.

In either 2-Hole or 3-Hole Methods, the ligature enters and exits the two closely spaced holes sequentially forming a loop called loop1 between the two closely spaced holes. Then the ligature, in the case of a 2-Hole Method, loops around the edge of the frame and passes underneath loop1. In the case of the 3-Hole Method, the ligature after forming loop1 between the pairs of closely spaced holes 1 and 2 enters and exits from the third hole before passing underneath loop1. The end of the ligature out from underneath loop1 is being named "free end" in all future references. The other end of the ligature will be referred to as the "active end" throughout this document.

The free end can be pulled freely with respect to the frame. However, exertion of any tensile force on the active end of the ligature increases the friction force between the two overlapping layers of the ligature. The increased friction along with the deformation of the ligature at the overlap segment causes the ligature and the frame to form a strong interlock.

The invention provides two different methods for facilitating unlocking or establishing means for quick adjustments of the system. The first method is to introduce a gap between the frame and the ligature. The second method involves employment of means for pulling loop1 upward. Such upward pulling means can be as simple as an additional ligature loop around loop1. The purpose of either method is to allow the user to easily pull the free end of the ligature from underneath loop1. Once the free end of the ligature is pulled from underneath loop1 the tension in the system is relaxed and adjustments or unlocking is then done with ease. To provide the gap, in the 3-Hole Method, an opening is employed. Such opening is located, in a preferred practice, between the paired holes (ie. holes1 and 2) and the third hole. Alternatively, a gap between the ligature and the frame is established by setting the third hole at a higher elevation. In the case of a 2-Hole Method, grooved or stepped edge of the frame provides the necessary gap between the ligature and the frame. The purpose of the gap is to provide a space where the user can hold and pull the ligature from underneath loop1. The second method of easy unlocking employs an additional complete loop around loop1. Although an external body can be used to form the extra complete loop, in a preferred practice, the same ligature that interacts with the frame can be used to form the mentioned complete loop around loop1. To form the complete loop around loop1 the free end of the ligature is passed underneath loop1 again. Securing means including cable, beaded or, wire tie, etc. can be used to secure the complete loop around loop1. Pulling the complete loop upward pulls loop1 upward and the system becomes unlocked. Pulling outward the end of the ligature that is in the immediate vicinity and underneath loop1 tightens (locks) the system.

In the Loop-Turning Method the frame is comprised of sets of paired holes. Each two holes that form a pair should be spaced close to each other. A ligature enters and exits one of the paired holes. The ligature then forms ½ turn loop around the body of the frame before entering and exiting the other hole of the paired set. A force applied to the frame causes the frame to move freely along the length of the ligature. However, a simple turning of the mentioned ½ turn loop over the edge of the frame from one side to the other side establishes an overlap between two segments of the ligature. This overlap prevents any relative motion between the frame and the ligature in one direction. Relative motion between the ligature and the frame is possible in the opposite direction. In other words, the simple loop turning makes the assembly a one-way clutch!

The mentioned methods of forming a one-way clutching action have many diverse applications. Citing every single application is totally beyond the scope here. In general, wherever a ligature has to interact with another object the methods of one-way clutching offer themselves useful. Essentially, either an object (that requires interaction with a ligature) adapts a method of one-way clutching within its body and functions as a frame, or a separate frame interfaces the object and its ligature. A few examples are cited here and are detailed in the following sections.

The methods of one-way clutching have applications in wearable items (i.e. clothing items, gloves, shoes, helmets, boots, hair bows, etc.). Here, either the wearable itself plays the role of the frame or a separate frame acts as an interface between the wearable and its ligature. The advantages are that a permanent and infinitely adjustable knot that quickly unties will replace traditional methods of fastening. Further, since tightening or loosening of the system requires only one hand, the methods are ideal for people who have only one hand. Different designs for adapting the methods to wearable items are discussed.

In packaging, the body of the package itself can be modified to function as a frame that is able to receive and interact with a ligature. The same applies to luggage carriers such as car top luggage carriers where the body of the luggage carrier functions as a frame. Similarly, the methods have applications in fixtures for securing several wires (such as computer or electrical wires) together. The direct adaptation of the methods of one-way clutching to the body of other objects eliminates the need for an external entity to function as a frame thereby making the design more efficient and possibly simpler.

In tents the one-way clutching methods can be an integrated part of the structure of the tent and/or its peg. Other structures such as parachutes, convertible tops, and cargo covers can adapt and take advantage of the methods as well. The same extends to ligatures used for securing a pole or a tree in place by fastening them to a fixed object such as the ground.

In belts, including seat belts, the one-way clutching methods can be an integrated part of the structure of the belt or its buckle. Advantages are infinite adjustments and ease of untying.

In ligature ladders, the one-way clutching methods offer advantage over commercially available ligature ladders. Here, the methods of one-way clutching allow total and infinite adjustments of the space between the ladder steps. The ladder steps can move freely up and down the support ligature and they can be locked at any desired position.

The methods have application in ascending/descending devices as well. In this case one or two pairs of parallel ligatures are employed. If two pairs of parallel ligatures are employed, two stepping-elements, each having adapted a method of one-way clutching, intermediate each pair of the parallel ligatures. The ascender pushes and pulls the stepping elements up the parallel ligatures as he/she climbs. If only one pair of parallel ligature is employed, each one of the ligatures employs only one stepping element. By setting the system horizontally instead of vertically the mentioned structure can be function as a fun exerciser machine.

In pulling or lifting devices, the methods have proven applications as well. Here the frame is held fixed, one end of the ligature is connected to the object being pulled or lifted. Pulling the other end of the ligature moves the object toward the frame.

In power transmission, a fixed frame is employed that directly interacts with the power-transmitting element. This arrangement allows power transmission only in one direction. The system locks up if an attempt is made to transmit power in the opposite direction. Conventional one-way clutches interact directly with the driver or the driven elements. However, in this invention the one-way clutching element (i.e. frame) interacts directly with the power-transmitting element (i.e. ligature).

BRIEF EXPLANATION OF THE DRAWINGS

FIG. 5 Show the force analysis; stressing the importance of keeping paired holes separated from each other by a specific distance.

FIG. 6 Show methods for reducing the friction between the frame and the ligature.

FIG. 7 Show the Loop-Turning Method applied to a round frame.

FIG. 8 Show a possible adaptation of the methods to luggage carriers.

FIG. 9 Show possible adaptation of the methods to swings.

FIG. 20 Show an ascending/descending composed of parallel ligatures and their movable steps FIG. 21 Shows a power transmitting assembly. Here a fixed frame using the 3-Hole Method intermediates the power transmitting ligature.

DESCRIPTION OF THE INVENTION

Figure 1:
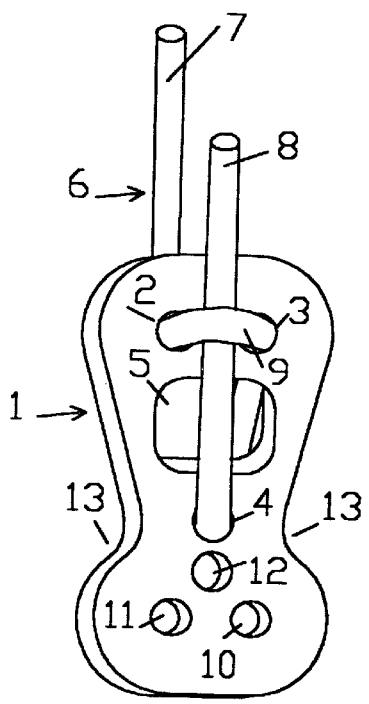
FIG. 1 Shows a frame-ligature assembly using the 3-Hole Method. Here an opening within the body of the frame provides a gap between the frame and the ligature.

This invention centers around inventor's discovered methods of creating a one-way clutching action between a ligature and a frame. Three methods: 2-Hole Method, 3-Hole Method and, Loop-Turning Method are discussed and explained. This follows by the examples of the application of the methods to new and existing products.

In accordance with this invention, a frame is provided. The frame depending on where and why the one-way clutching is needed, can be made of wood, plastic, leather, fabric, cardboard, metals, composites, etc. The frame provides strategically located openings or holes. In a preferred practice, the cross section of the holes should be similar to and a bit larger than the cross section of the ligature. The function of the strategically located openings is to allow relative motion between the ligature and the frame only in one direction. Further, the system is designed to provide infinite adjustments and easy release of the lock formed between the ligature and the frame. Since the main function of the frame is to provide strategically located holes, the frame itself can assume many different shapes depending on the particular usage or cosmetic requirement. The frame can be a simple flat body, spherical body, cylindrical body, elliptical body or any combination thereof Further, the frame can be another product altogether. Any product that uses a ligature to perform its function can potentially serve as a frame and adapt the cited methods within its body.

The frame plays the central role in this invention. To conform to the one-way clutching method, the frame will have sets of 2 holes in the 2-Hole Method, or sets of 3 holes in the 3-Hole Method. In a preferred practice, the three mentioned holes of the 3-Hole Method should form an isosceles triangle. In either case of the 2-Hole Method or the 3-Hole Method, two of the holes in each set should be spaced apart by a specific distance. For ligatures with a round cross section, the specific distance, measured from the inner edge of one hole to the inner edge of the other hole, should approximately be equal to the diameter of the ligature. Otherwise for ligatures with a flat cross section, the specific distance, measured from the inner edge of one hole to the inner edge of the other hole, should not be more than the width of the ligature. From the mechanical viewpoint, this is an important aspect of this invention for two reasons. The first reason is that maintaining the mentioned specific distance between at least two of the holes assures an optimum positive locking between the ligature and the frame in one direction regardless of the magnitude of the applied load. With this arrangement, as the load increases, the friction force increases proportionally as well assuring the formation of a positive lock between the frame and the ligature. The second reason for setting the holes apart by said specific distance is to eliminate or reduce the biting onto the ligature by the edges of the frame holes. This biting may cause damage to the ligature and shorten its life.

Figure 2:
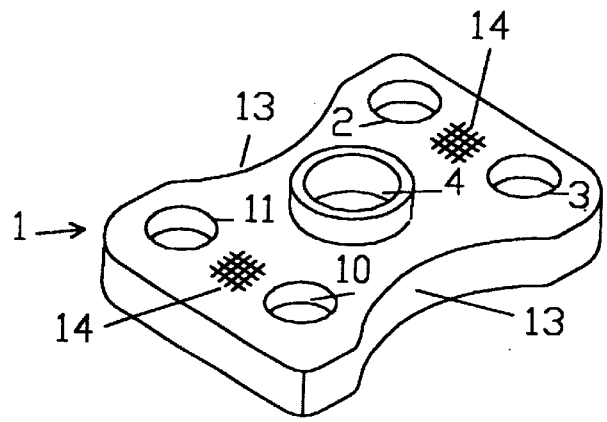
FIG. 2 Shows a frame using the 3-Hole Method. Here the central hole is set at a higher elevation in order to create a gap between the frame and the ligature.

The methods of one-way clutching will be fully understood from the accompanying drawings. Referring to FIG. 1 that shows the 3-Hole Method, the frame is identified as 1, the three holes are identified as 2, 3 and 4, and the opening separating the two closely spaced holes 2 and 3 from the third hole 4 is marked as 5. The ligature is marked as 6. The normally loaded (i.e. under tension or active) side of the ligature is marked as 7 and the normally loose end (or free end) of the ligature is marked as 8. Holes 2 and 3 should be spaced so that the inner edge to inner edge distance between them equals the diameter (or width) of the ligature. As shown in FIG. 1, ligature 6 enters and exits from holes 2 and 3 sequentially. In this manner loop 9 is formed by ligature 6 between holes 2 and 3. Loops such as loop 9, formed by the ligature within the body of the frame are referred to as loop1 in claims and in other references throughout this document. Ligature 6 after forming loop 9 enters and exits hole 4 before passing underneath loop 9. When a tensile force is applied to the end 8 of ligature 6, a relative motion between ligature 6 and frame 1 is possible. However, when a tensile force is applied to end 7 of ligature 6, the segment of ligature 6 that forms loop 9 push on the segment underneath and an interlock between frame 1 and ligature 6 will be established. The friction force between loop 9 and the segment underneath loop 9 and the friction force between the segment underneath loop 9 and the frame increases directly with the increase in the tensile force applied to end 7 of ligature 6. Also the degree of deformation of the ligature segment that forms loop 9 and ligature segment underneath loop 9 increases directly with the increase in the tensile force applied to end 7 of ligature 6. Therefore, the degree of locking between ligature 6 and frame 1 increases with the applied tensile force. To release (or untie) the lock between ligature 6 and frame 1 with ease an opening 5, as shown in FIG. 1, is introduced. Opening 5 separates holes 2 and 3 from hole 4. Opening 5 allows the user to hold the portion of ligature 6 that passes over the opening 5 in order to pull the free end 8 from underneath loop 9 with ease. This pulling from underneath loop 9 reduces the tension in the active side 7 of the ligature. This tension reduction lowers the friction force between the overlapping segments of ligature 6 and unlocking is immediate. An alternative way for creating a gap between ligature 6 and frame 1 is to set hole 4 at a different elevation than holes 2 and 3 as shown in FIG. 2. Here ligature 6 follows the same path as shown in FIG. 1. The gap between ligature 6 and frame 1 is formed close to the edge of hole 4. There may be multiple sets of holes 2, 3, 4, and 5 enabling multiple ligature ends to be tied down to the same frame. FIG. 1 shows holes marked as 10, 11 and 12. The functions of these holes are the same as holes 2, 3 and 4. Holes 10, 11 and 12 are used to connect the other end of ligature 6 or an end of another ligature to the frame. In some applications curvatures 13 are provided along the outside boundary of frame 1, as shown in FIG. 1. Curvatures 13 allow the user to hold frame 1 between thumb and index fingers of one hand while pulling free end 8 of ligature 6 by the other hand to tighten the system. In some applications surface ridges, as shown by numeral 14 in FIG. 2, maybe employed between holes 1 and 2. The function of the surface ridges is to increase the locking capacity of the frame by introducing a relatively rough surface. The ligature segment that is underneath loop 9 of FIG. 1 is subjected to a compressive force exerted by loop 9. This compressive force pushes the ligature into the surface ridges thereby providing a more secure locking. The surface ridges maybe dull and may have a random shape.

Figure 3:
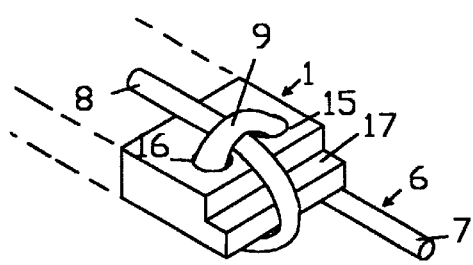
FIG. 3 Shows a frame-ligature assembly using the 2-Hole Method. Here the edge of the frame provides the necessary gap between the frame and the ligature.

The 2-Hole Method is shown in FIG. 3. Frame is marked as 1 and ligature as 6. Holes 15 and should be spaced apart, inner edge to inner edge, by a distance approximately equal to the diameter (or width) of the ligature used. Ligature 6 enters and exits hole 15 and hole 16 in sequence forming loop 9 between holes 15 and 16. Ligature 6 then forms a loop around the edge of frame 1 before passing underneath loop 9. The 2-Hole Method functions the same as the 3-Hole Method except that the gap between ligature 6 and frame 1 is provided through a stepped structure 17 at the edge of frame 1. It is understood that a groove within the edge of frame 1 can be used instead of the stepped structure. The surface ridges and boundary curvatures as explained above maybe employed here as well.

Figure 4A:
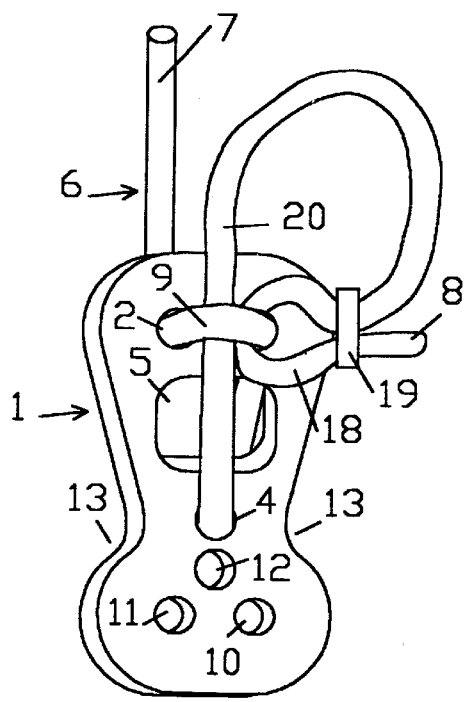
FIG. 4 Show a frame-ligature assembly using the 3-Hole Method. Shown here is an additional loop used for a quick unlocking/adjustments of the system.

A quick unlocking method of introducing a gap between the frame and the ligature was explained above. A different method for quick unlocking or quick adjustments of the system is through formation of a complete loop by ligature 6 around loop 9. FIG. 4A shows that end 8 of ligature 6 forms complete loop 18 around loop 9. Complete loop 18 is secured by element 19. Securing element 19 maybe as simple as a beaded or cable tie or it maybe composed of a more elaborate structures that function by compressing ligature segments together by means such as threaded fasteners, screws or similar. Pulling loop18 upward loosens the system. This upward motion pulls loop 9 upward which in turn pulls segment 20 from underneath loop 9 and that win loosen the system. To tighten (lock) the system segment 20 of ligature 6 must be pulled.

Figure 4B:
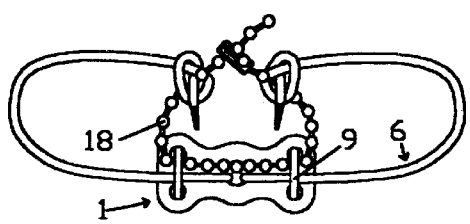

Obviously, instead of using ligature 6 to form a complete loop around loop 9, one may employ a separate body for the same purpose. FIG. 4B shows employment of an external body (shown as a Beaded Tie) to serve as a means for pulling loop 9 upward.

FIGS. 5A and 5B show force analysis for a ligature that has a round cross section. The analysis stresses the importance of maintaining the mentioned specific distance between two paired holes. In FIG. 5A, the segment of the ligature under loop1 is marked as 21 and the two paired holes are marked as 2 and 3. The vertical force on section 21 is equal to twice of the tensile force F within the body of the ligature multiplied by cosine of the angle shown by numeral 22 (i.e. 2*F*cos(22)). The maximum force on section 21 occurs when angle 22 is equal to zero. Angle 22 is equal to zero when the inner edge to inner edge distance between holes 2 and 3 is equal to the diameter of the ligature as shown in FIG. 5B. Conclusion is drawn here that in order to establish an optimum performance the inner edge to inner edge distance between two paired holes should approximately be equal to the diameter of the ligature. For a ligature with a flat cross section, following the same analysis, establishes that the inner edges of holes 2 and 3 should not be spaced apart more than the width of the ligature.

Obviously all edges should be smooth and all holes should have smooth boundaries. Bushings or eyelets may be employed to facilitate relative motion between ligature 6 and frame 1. In some applications it may be necessary to further reduce the friction between the ligature and the frame. One may employ pulleys and/or rollers or employ a protective layer made from low friction materials to reach this objective. FIG. 6A shows a typical situation where roller 23 is used. FIG. 6B show a typical situation where pulleys 24 and 25 are used. FIG. 6C shows one possible way for using a protective shell 26 made of a low friction material to reduce friction between the frame and the ligature.

Other variations of the design include making the gap between the frame and the ligature adjustable. One can simply achieve this by making hole 4 of FIG. 2 as a separate body which threads into frame 1. In order to increase flexibility, the frame can be designed to have segments that have the ability to rotate with respect to each other. For example, the frame shown in FIG. 1 can be designed to pivot around a horizontal axis that passes between holes 4 and 12.

FIGS. 7A and 7B shows the principle behind the Loop Turning Method. Frame 27, as shown in FIGS. 7A and 7B, comprised of a pair of closely spaced holes 28 and 29. Ligature 30 enters and exits hole 28. Ligature 30, in a preferred practice, makes a ½ turn loop around the body of frame 27 before entering and exiting hole 29. It is understood that ligature 30 can make one or more complete loops around frame 27 before entering and exiting hole 29. Frame 27 is free to move up or down ligature 30. However, when the ½ turn loop is turned from one side to the other side over an edge of frame 27, as shown in FIG. 7B, two segments of ligature 30 overlap. This overlap prevents frame 27 from moving downward along ligature 30. However relative motion is possible in the opposite direction. The turning of the ½ turn loop from one side to the other side converts the system into a one-way clutching system. To reverse the direction of the possible relative motion, one can turn the ½ turn loop over the opposite edge of frame 27. Alternatively, reversing the order in which ligature 30 enters holes 28 and 29 reverses the direction of possible relative motion between ligature 30 and element 27.

Examples of the Applications of the Methods to Specific Products

This invention has numerous applications. Anywhere that a ligature and a body have to interact this invention offers advantages over the conventional methods of forming a knot. The advantages include the ease of creating a strong lock, the possibility for infinite adjustment and, the ease of unlocking. The examples that are mentioned in the following by no means constitute a complete list. Obviously, citing every application where a ligature is employed for some function will be beyond the scope of this document. Therefore, the discussion is limited to a few more popular products.

Throughout this document the term frame is being defined as any structure with at least one of the methods of one-way clutching integrated within its body.

In wrapping and packaging, one can wrap a ligature around a package and then lock the ligature ends to a frame that has adapted one of the cited methods of one-way clutching. Alternatively, the package itself can be modified to act as a frame. Knot Zappy is the name given to typical frames used for general packaging. Knot Zappy may have a structure similar to the one shown in FIG. 1, FIG. 2 or, FIG. 3. To wrap several ligatures around a package in different directions, one may employ several Knot Zappys that are connected to a common body. Knot Zappys maybe designed to be able to freely rotate around the mentioned body.

The frame as defined in this invention can function as belt buckle. The advantages of a belt that is able to adjust endlessly are obvious. Alternatively, the body of the belt itself can function as a frame. This eliminates the need for a separate buckle. The term belt and buckle is general and includes seat belts and other similar structures where normally segments of the belt has to be interlocked in an adjustable manner.

Another use for the methods of one-way clutching is in tents and similar structures. Segments of the tent that connects, by a ligature, to a tent peg, can adapt the methods of one-way clutching and function as a frame. Similarly, the tent peg can adapt the methods of one-way clutching and function as a frame as well. The user then can simply lock one end of the ligature to the tent and the other end to the peg. With this arrangement infinite adjustments and easy release is at hand. Similarly, structures such as parachutes, convertible tops and cargo covers can take advantage of the mentioned methods.

Since hammocks are usually made from an array of ropes connected to a rigid body, the methods of one-way clutching can be useful tools connecting the ropes and the rigid body.

The methods of one-way clutching have applications in the design of auto top luggage racks as well. While there are many possible variations, FIG. 8A shows a frame that has employed the 3-Hole Method of one-way clutching within its structure and can slide along the length of an auto top luggage rack. Alternatively, FIG. 8B shows one of many possible ways that the rack structure itself can be modified to function as a one-way clutching frame. This design is not limited to auto top luggage carriers and can be applied similarly to other structures such as sides of a small or large trucks, etc.

Another use for this invention is in the design of backyard swings. Here the body of the swing itself functions as a frame that connects via a ligature to a support structure (i.e. a tree). Alternatively, a separate frame can be employed to function as an interface between the swing body, its ligature and, the support ligature. Many variations are possible. Two designs are shown in FIGS. 9A and 9B.

The methods have application in pulling and lifting devices as well. In these applications the frame will be set fixed at a desired location. The object to be pulled or lifted will be connected to end 7 of ligature 6 (FIG. 1). Pulling end 8 of ligature 6 pulls or lifts the object toward the frame. The advantage is that one does not have to continuously exert a tension on end 8. If the tension on end 8 is released, the system locks itself and the object remains locked in its position. This discussion extends itself to towing devices as well.

Other applications include a potential use as a hair bow. Similarly the methods provide an adjustable and releasable means when securing several wires together. The wires include electric or computer wires.

Applying the methods of one-way clutching to wearable items provides a simple means for connecting one segment of a wearable to another segment or to another object. Advantages are many. Among them are structural simplicity, ease of use, infinite adjustments, quick locking and, quick unlocking. There are several methods for applying the one-way clutching methods to wearable items. The wearable items include clothing items, shoes, gloves, boots, helmets, etc.

Figure 10A:
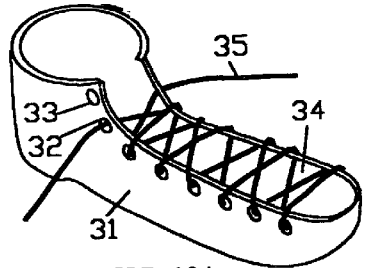
FIG. 10 Show the direct application of the 2-Hole Method to wearable items (the shoe represents a wearable).
Figure 10B:
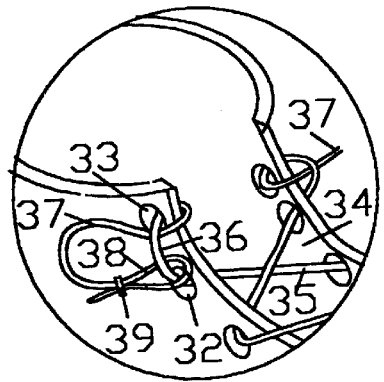

FIGS. 10A and 10B show the 2-Hole Method applied to a shoe. Application to other wearable items follows the same procedure. Here, shoe 31 comprised of at least one set of holes 32 and 33 on either side of its longitudinal opening 34. Holes 32 and 33 should be spaced apart by the mentioned specific distance. In figure 10B shoelace 35 forms loop 36 between holes 32 and 33. Ligature 35 then loops around the edge of longitudinal opening 34 before passing underneath loop 36. The other end of shoelace 35 interacts the same way with pairs of holes on the opposite side of longitudinal opening 34. Simply pulling end 37 of shoelace 35 tightens and locks in place shoelace 35. The system loosens when end 37 is pulled out from underneath loop 36. There are several ways that one can facilitate untying of shoelace 35. These approaches follow previous discussions of forming a gap between the ligature and the frame or employing additional loop around loop 36. Specifically, one approach (not shown) is to set the edge of longitudinal opening 34 at a different elevation than the elevation of holes 32 and 33. Another approach is to introduce an opening between loop 36 and the edge of longitudinal opening 34. The purpose is to create a gap between shoelace 35 and shoe 31. The gap provides space where the user can hold and pull shoelace 35 out from underneath loop 36. Alternatively, in a preferred practice, a complete loop 38 is formed by shoelace 35 around loop 36 and is secured by element 39 as shown in FIG. 10B. Pulling up loop 38 loosens the system. Pulling segment 37 tightens the system.

Figure 11A:
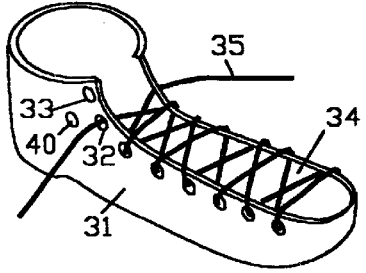
FIG. 11 Show the direct application of the 3-Hole Method to wearable items (the shoe represents a wearable).
Figure 11B:
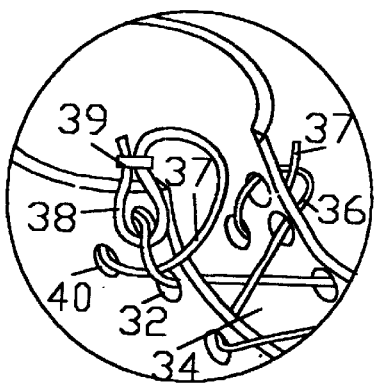
Figure 11C:
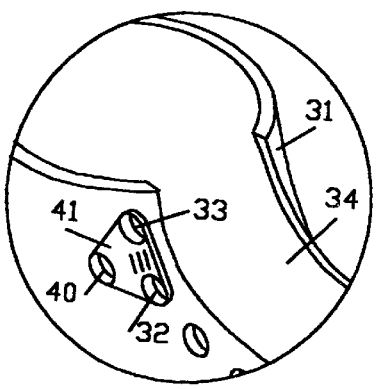

FIGS. 11A and 11B show a direct application of the 3-Hole Method to a wearable item. The wearable item is shown as a shoe. The numerals marking FIGS. 11A and 11B are the same as numerals in FIGS. 10A and 10B except for additional hole 40. Shoe 31 is comprised of at least one set of 3 holes 32, 33 and 40 on either side of its longitudinal opening 34. Holes 32 and 33 should be spaced apart by the mentioned specific distance. In a preferred practice, the 3 holes 32, 33 and 40 form a triangle. Shoelace 35 enters and exits holes 32 and 33 in sequence forming loop 36 between holes 32 and 33, as shown in FIG. 11B. Shoelace 35 then enters hole 40 before passing underneath loop 36. To facilitate the tightening and loosening of shoelace 35, methods of providing a gap between the ligature and the frame is applicable here. These methods are the same as was discussed in the above paragraph in relation to the 2-Hole Method. FIG. 11B shows a preferred practice of forming a complete loop 38 by shoelace 35 around loop 36. Element 39 secures complete loop 38. Again, pulling complete loop 38 loosens the system. Pulling segment 37 of shoelace 35 tightens the system.

In some applications the system may function better if the longitudinal opening, or part thereof employ additional support in the form of a rigid or semi rigid structure. Therefore, metals, plastics, leather or similar material may be introduced as part of the structure of the shoe in the vicinity of the longitudinal opening. FIG. 1 C shows one possible application of such support structure. Here patch 41 is employed to give the system more rigidity. The patch 41 can be mounted inside, outside, wrapped around or, be sandwiched between layers of longitudinal opening 34.

Figure 12:
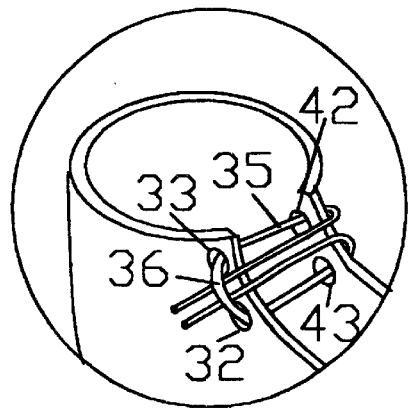
FIG. 12 Shows an alternative way for applying the 2-Hole Method directly to wearable items (the shoe represents a wearable).

FIG. 12 shows yet another method for adapting the 2-Hole Method to shoes or other wearable items. Here longitudinal opening 34 comprises of sets of paired holes. Holes 32 and 33 form one such pair. Holes 42 and 43 are the corresponding pair of holes alongside the opposite side of longitudinal opening 34. Holes 32 and 33 should be spaced apart by the mentioned specific distance. The same applies to holes 42 and 43. Ligature 35 forms loop 36 between holes 32 and 33. Both ends of ligature 35 after passing through holes 42 and 43 pass underneath loop 36. Pulling both ends of ligature 35 outward tightens the assembly. Pulling ligature 35 out from underneath loop 36 loosens the assembly. Introducing a gape between ligature 35 and the wearable or employing an additional loop around loop 36 are methods that can be used to facilitate the loosening process. These methods are the same as were discussed before.

In the previous sections methods where a wearable itself adapted one of the one-way clutching methods within its structure and functioned as a frame were discussed. There are several methods where a separate frame functions as an interface between a wearable and its ligature.

FIGS. 13, 14, 15 and 16 show some of the many possible ways that an external frame maybe employed to interact with a wearable and its ligature. Although the figures show a shoe, interaction with other wearable items follow the same procedure. In the case of a shoe the separate frame that interfaces the shoe and its shoelace is called a Shoe Zappy. In FIG. 13A, 44 is a shoe having a series of holes alongside its longitudinal opening 45. Two such side-by-side holes are marked as 46 and 47. Shoelace is 48, frame or Shoe Zappy is 49. Shoe Zappy 49 10 comprises of 5 holes 50, 51, 52, 53 and 54. Hole 52 is centrally located. Holes 50 and 51 should be spaced apart by the mentioned specific distance. This applies to holes 53 and 54 as well.

Figure 13A:
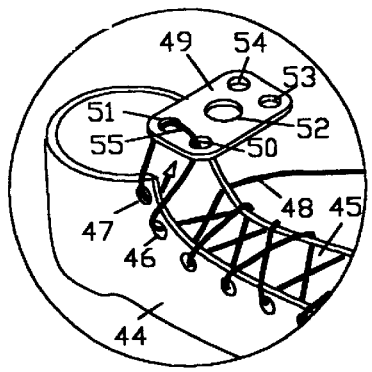
FIG. 13 Show how a separate frame with integrated 3-Hole Method interfaces with a wearable and its ligature (the shoe represents a wearable).
Figure 13B:
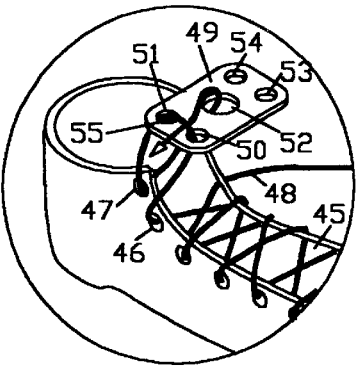
Figure 13C:
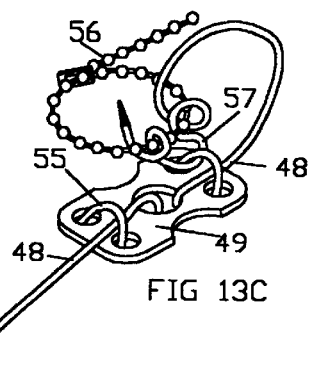

Shoelace 48 after crisscrossing through all but the last hole 47, enters and exits hole 50 and 51 of Shoe Zappy 49 in sequence forming loop 55 between holes 50 and 51. Shoelace 48, then, first enters hole 47 of shoe 44 (FIG. 13A), and next, enters hole 52 of Shoe Zappy 49 before passing underneath loop 55 as shown in FIG. 13B. FIG. 13B shows the path of only one end of the ligature. The other end of ligature 48 interacts with the holes on the opposite side of longitudinal opening 45 and holes 53, 54 and 52 of Shoe Zappy 49 in a similar fashion. Pulling shoelace ends tightens the system. In order to facilitate untying, in a preferred practice, shoelace 48 forms a complete loop around loop 55. FIG. 13C shows how Shoe Zappy 49 and shoelace 48 may employ securing element 56 to form and secure a complete loop 57 around loop 55. The other end of the ligature interacts the similarly with the same securing element 56. After both ends of the ligature are connected to the securing element 56, securing element 56 is pulled tight and locked in place. Element 56 is shown as a Beaded Tie in FIG. 13C. However, it is understood that other more elaborate means that may include structures to press the shoelace segments together maybe used. The function of such structure would be to secure the complete loop 57 in place by pressing segments of the ligature together. Pulling up loop 57 by lifting the securing element 56 upward loosens the system. Pulling shoelace segments outward from underneath loop 55 tightens the system. Obviously shoelace 48 can criss-cross through all holes including hole 47 before forming loop 55 in Shoe Zappy 49. In this case, after formation of loop 55, shoelace 48 passes through hole 52 of Shoe Zappy 49 before passing underneath loop 55. FIG. 4B shows yet another method that an external body maybe employed to form a complete loop around loops such as loop 55.

Figure 14A:
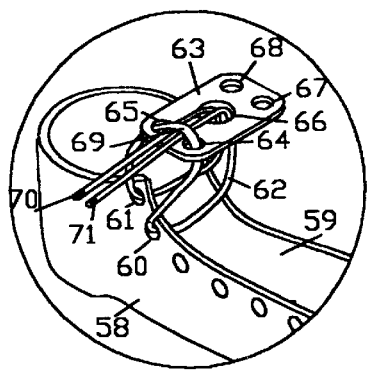
FIG. 14 Show another possible way that a separate frame with integrated 3-Hole Method interfaces with a wearable and its ligature (the shoe represents a wearable).
Figure 14B:
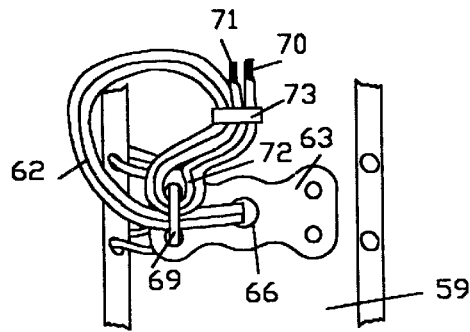

FIGS. 14A and 14B show another method of using a frame to interface a wearable and a ligature. In this method one end of the frame, in a preferred practice, is secured to or is an integrated part of the wearable. Otherwise, two independent ligatures are used; each ligature interacting with one side of the frame. In FIGS. 14A and 14B application of the method to shoes are shown. Other wearable items follow suit. In FIG. 14A and 14B only one shoelace is shown. If used, the other shoelace interacts with shoe zappy and the shoe in exactly the same way as the shoelace shown in FIGS. 14A and 14 B. In FIG. 14A, 58 is a shoe having longitudinal opening 59. Longitudinal opening 59 has alongside its edge a series of holes. 60 and 61 are two side by side hole of longitudinal opening 59. Shoelace is marked as 62 and frame or shoe zappy is marked as 63. Shoe Zappy 63 has five holes 64, 65, 66, 67 and 68. Holes 64 and 65 should be spaced apart by the mentioned specific distance. The same applies to the paired holes 67 and 68. Shoelace 62 forms loop 69 between holes 64 and 65. Shoelace 62 after passing through holes 60 and 61 of wearable 58, passes through central hole 66 of Shoe Zappy 63. Both ends of shoelace 62 then pass underneath loop 69. Pulling ends 70 and 71 of shoelace 62 outward tightens the assembly. Pulling shoelace 62 out from underneath loop 69 loosens the assembly. In a preferred practice, to facilitate untying, both ends 70 and 71 of shoelace 62 form a complete loop around loop 69. FIG. 14B shows complete loop 72 formed by shoelace 62 around loop 69. Element 73 secures complete loop 72 around loop 69. Pulling segments secured by element 73 upward loosens the system.

Figure 15A:
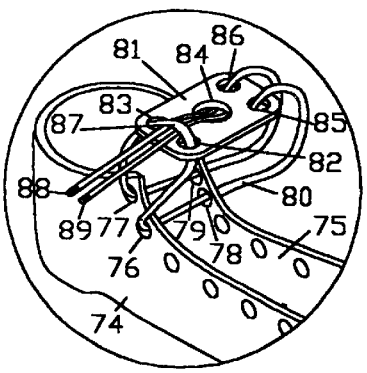
FIG. 15 Show yet another possible way that a separate frame with its integrated 3-Hole Method interfaces with a wearable and its ligature (the shoe represents a wearable).
Figure 15B:
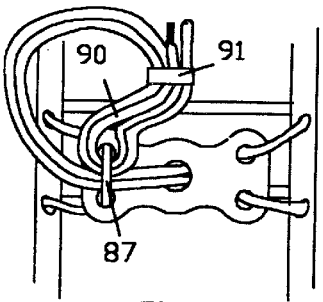
Figure 15C:
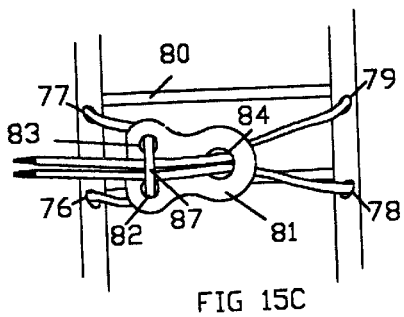

FIGS. 15A and 15B show yet another method for using a separate frame to interface a wearable and a ligature. FIGS. 15A and 15B shows shoe 74 having a series of holes alongside its longitudinal opening 75. Two side by side holes of longitudinal opening 75 are marked as 76 and 77. Holes 78 and 79 are corresponding holes to holes 76 and 77 on the other side of longitudinal opening 75. Shoelace is marked as 80 and Shoe Zappy having holes 82, 83, 84, 85 and 86 is marked as 81. Holes 82 and 83 should be spaced apart by the mentioned specific distance. The same applies to holes 85 and 86. Shoelace 80 forms loop 87 between holes 82 and 83. Shoelace 80 then passes through holes 76,77, 78 and 79 as shown in FIG. 15A. Shoelace 80 then enters holes 85 and 86 of Shoe Zappy 81. Both ends of shoelace 80 then enter central hole 84 before passing underneath loop 87. Pulling ends 88 and 89 tightens the assembly. Pushing Shoe Zappy 81 sidewise loosens the system. To facilitate untying, complete loop 90 maybe formed and secured around loop 87 by element 91 as shown in FIG. 15B. FIG. 15C shows a variation of the design. Here Shoe Zappy 81 has only 3 holes 82, 83 and 84. Shoelace 80 follows the path shown in FIG. 15C and after passing through holes 78 and 79, passes directly through central hole 84 of Shoe Zappy 81 before passing underneath loop 87.

Figure 16A:
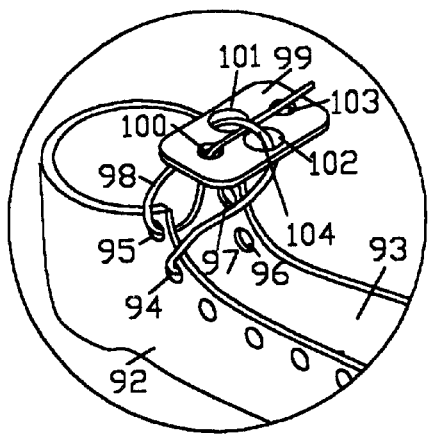
FIG. 16 Show variation in the design of a frame that interfaces a wearable and its ligature.
Figure 16B:
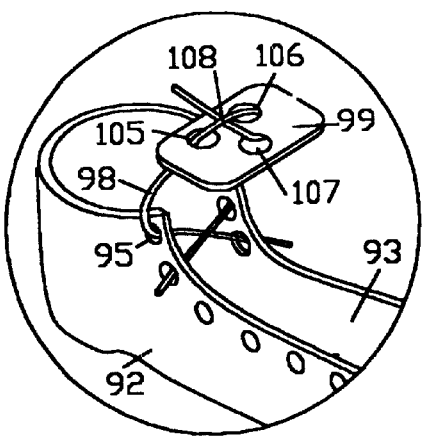

FIGS. 16A and 16B show yet two other variations of the design. Here holes used for forming loop1 are shared by both ends of the ligature. In FIG. 16A, shoe 92 comprises of a longitudinal opening 93. Holes 94 and 95 are a pair of side by side hole alongside the edge of longitudinal opening 93. Holes 96 and 97 are corresponding side by side holes on the opposite side of longitudinal opening 93. Shoelace is 98. The frame or Shoe Zappy is 99. Shoe Zappy 99 has 4 holes; 100,101, 102 and 103. Holes 101 and 102 should be spaced apart by the mentioned specific distance. Holes 100, 101 and 102 form a triangle. In a preferred practice, hole 103 is a mirror image of hole 100 with respect to an axis joining centers of holes 101 and 102. Shoelace 98 after crisscrossing through the holes alongside longitudinal opening 93, passes through hole 94. Shoelace 98 then forms loop 104 between holes 101 and 102 of Shoe Zappy 99. Shoelace 98, then, first passes through hole 95 of shoe 92, and next, passes through hole 100 of Shoe Zappy 99 before passing underneath loop 104. The other end of shoelace 98 interacts the same way with holes on the opposite side of longitudinal opening 93 and then forms another loop 104 between holes 101 and 102. This design functions the same as other designs. The difference is that both ends of the shoelace 98 share holes 101 and 102 in forming loop 104. FIG. 16B is a variation in the design where Shoe Zappy 99 has three holes 105, 106 and 107. Holes 105 and 106 should be spaced apart by the mentioned specific distance. Both ends of shoelace 98 form loops 108 between holes 105 and 106. Both ends of shoelace 98 then enter hole 107 before passing underneath loop 108 (only one such loop is shown in the figure). Both ends of shoelace 98 share holes 105, 106 and 107. Tightening and loosening is done as explained in conjunction with other designs. One may wish to form a complete loop around loops 108 as explained before.

Figure 17:
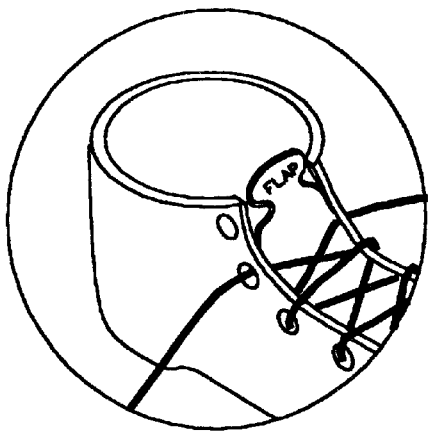
FIG. 17 Shows a redesigned Shoe Flap.

When loosening the system, ligature moves relative to the frame. In some applications such as shoes where a shoe flap is employed, the shoe flap may exert pressure on the ligature and thereby restrict the free relative motion of the shoelace with respect to the last hole of the shoe. A redesigned shoe flap eliminates this problem. The objective in redesigning the flap is to eliminate any contact between the flap and the shoelace. One such redesigned flap is shown in FIG. 17.

Figure 18:
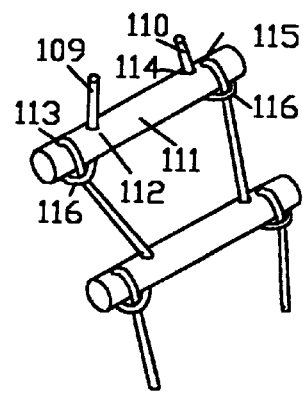
FIG. 18 Shows application of the 2-Hole Method to a ligature ladder.

Another use for this invention is in the design of ligature ladders. Introduction of methods of one-way clutching to the steps of a ligature ladder provides a system that is simple in structure and has a unique feature of being adjustable. FIG. 18 shows formation of a ligature ladder using the 2-Hole Method. Parallel ligatures 109 and 110 and step elements 111 form a ligature ladder. Each of step elements 111 comprise of two holes 112 and 113 close to one end and holes 114 and 115 close to the other end. In a preferred practice, holes 112 and 113 should be spaced apart by the mentioned specific distance. The same applies to holes 114 and 115. Ligature 109 enters and exits holes 112 and 113 of step elements 111 in sequence forming loop 116 between holes 112 and 113. Ligature 109 then wraps around step element 111 and passes underneath loop 116. Ligature 110 interacts with holes 114 and 115 in a similar fashion. The assembly procedure continues the same way with other step elements 111 to form an adjustable ligature ladder. Here adjustment is possible only in the upward direction. A force applied, in the upward direction to step elements causes the step elements to move upward relative to the ligature. However, relative motion between the ligatures and the step elements in the downward direction is impossible regardless of the magnitude of the force applied.

Figure 19A:
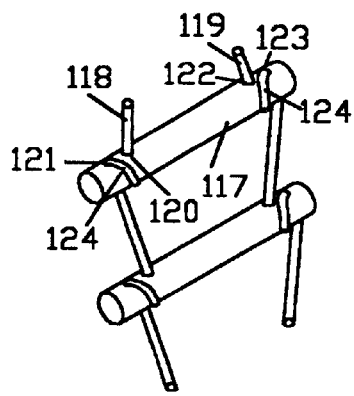
FIG. 19 Show application of the Loop Turning Method to ligature ladder
Figure 19B:
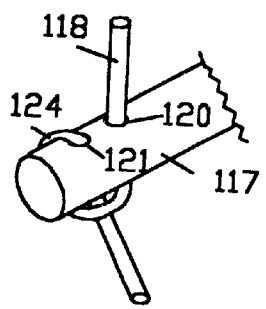

FIG. 19A and 19B show formation of a ligature ladder using the Loop Turning Method. Here adjustment is total and is possible in both up or down directions. Element 117 is a ladder step and two parallel ligatures 118 and 119 are the support ligatures. Element 117 comprises of two holes 120 and 121 close to one end and holes 122 and 123 close to the other end. In a preferred practice, holes 120 and 121 should be spaced apart by the mentioned specific distance. The same applies to holes 122 and 123. Ligature 118 passes through hole 120, then, forms a ½ turn loop 124 around step element 117, and then, passes through hole 121. The same arrangement is formed between ligature 119 and holes 122 and 123 as shown in the FIG. 19A. In this manner, element 117 can travel over the length of two parallel ligatures 118 and 119 in either direction up or down. Ligatures 118 and 119 then follow similar arrangement with other elements 117 to form a totally adjustable ladder. To lock elements 117 at any position along the length of ligatures 118 and 119, the user simply rotates the ½ turn loops 124 around the edge of elements 117 from one side to the other side as shown in FIG. 19B. This simple loop turning provides a positive locking for elements 117 with respect to ligatures 118 and 119, in the downward direction. The reason becomes clear when FIG. 19B is studied. Turning the ½ turn loop from one side to the other forms an overlap between portions of the ligature thus, preventing any downward movement. The system works as a fully adjustable ladder. It is also possible to lock elements 117 with respect to ligatures 118 and 119 in the upward direction instead of the downward direction. To accomplish this, ligature 118 should enter hole 121 (instead of hole 120), then after forming the ½ turn loop, ligature 118 enters hole 120. Similarly, ligature 119 should enter hole 123 instead of hole 122. To make the design child proof, one may employ either end caps that covers the ½ turn loop or grooved path at either end of element 117 maybe employed to secure the ½ turn loop in place. These safety measures are incorporated to make the turning of the ½ turn loop from one side to the other difficult for children. Also the use of proper identifiable markings (i.e. color coding) will help the user to visually establish if steps are in the locked position.

In either of the methods outlined above, relating to a flexible ladder, ladder steps can move freely, in at least one direction, relative to the support ligatures. Based on this observation, an ascending device comprised of only 4 step elements and 4 parallel ligatures is designed. FIG. 20A shows that parallel ligatures 125 and 126 and two elements 127 and 128 form half of the ascending device. The other half, which is set up side-by-side of the first half is formed by parallel ligatures 129 and 130 with step elements 131 and 132. Elements 127 and 128 interact with ligatures 125 and 126 using one of the one-way clutching methods. In a preferred practice, the Loop Turning Method is the ideal choice for this application. Elements 131 and 132 interact with their respective ligatures 129 and 130 in a similar fashion. The climber will have one of his/her foot resting on element 128 and the other foot resting on element 132. Climber holds elements 127 and 131 in his/her hands. To climb up, the climber shifts his/her weight say to the left half of the ascending device and pulls and pushes elements 131 and 132 of the right half of the ascending device up relative to support ligatures 129 and 130. Then the climber shifts his/her weight to the right half and pulls and pushes up step elements 127 and 128 relative to support ligatures 125 and 126. By repeating this rhythmic motion, the climber moves his/her body along with the step elements up the support ligatures. Obviously, in order for the climber to pull elements 128 and 132 upward, climber's feet should be connected to elements 128 and 132. This is simply done by using a structure similar to a toe clip of bicycle pedals. To provide additional safety, strap means can be used to connect the body of the climber to the step elements. In this manner, if the climber's arms or legs get detached from the step elements, the strap means keep the climber connected to the ascending device.

A variation of the above mentioned ascending device comprises of only two ligatures and two step-elements. Each ligature connects to the center of a step element via one of the one-way clutching methods as shown in FIG. 20B. Here climber rests his feet on one of the steps and uses both hands to hold the other step. The rhythmic motion of shifting weight between hands and feet allows the climber to pull and push steps up the ligatures as he/she climbs.

In the above-mentioned ascending device, it is required that the climber shifts his/her weight from one side to the other side in order to climb. The reason being that the tension in the support ligatures translates into a resistance to movement by the step elements. This resistance can potentially be used to design an exercise device. Such device comprises of horizontally parallel ligatures, resisting elements and, support structures. The support structures secure ends of the ligatures in place. The resisting elements, that maybe shaped like a round bar, intermediate the parallel ligatures. A method of one-way clutching provides the necessary connections between resisting elements and the ligatures. To exercise, one pulls or pushes resisting elements along the length of the ligatures. The tension in the ligatures establishes the degree of resistance. To change the ligature tension, one simply tightens or loosens the ligatures at their connection to the support structures. The ligature ends maybe connected to the support structure by one of the one-way clutching methods as well. The ascending devices outlined above can also be used as a descending device. A simple loop turning from one side to the other side conforms any Loop Turning ascending device into a descending device. The descent a person sits on a step element or sits on a seat hanging from the step elements. The person can control his/her rate of descent by exerting a force to segments of the ligatures that are hanging below the step elements. Otherwise, a person at the ground level controls the rate of descent by exerting tension on the segments of the ligatures that hang below step elements. The control can be electromechanical or manual. To further decrease the rate of decent, one can form more ligature loops around the step elements.

The ascending devices outlined above can also be set up in the horizontal direction rather than in the vertical direction. Such device can be used as a fun exerciser or as a challenging method for passing over rivers, canyons, etc.

FIG. 21 shows adaptation of the methods to power transmission. Here the assembly comprises of driver element 133, driven element 134, ligature 135 and frame 136. Driver element 133 can turn driven element 134 in only one direction, any attempt to turn the driver and driven elements in the opposite direction locks up the system as if a positive acting brake is applied.

Conventional one-way clutches interact directly with either the driver or the driven element.

However, in this invention, the one-way clutching element (i.e. frame 136) interacts directly with the power transmission ligature (i.e. ligature 135). 5 The vast potentials of the methods of one-way clutching is understood better when further examples are studied. The advantage in all applications is the possibility for infinite adjustment and the ease of locking/unlocking. The invention can be used as a means for hanging pictures, bird feeders or plants; as a means for securing breathing masks or gargles to their ligature; as a means for securing buttons to clothing. The advantage being that the buttons can be replaced at 10 will. Another use for this invention is in bras. Here either each side of a bra cup functions as a frame or a separate frame interfaces the cups and their connecting ligature. The methods can potentially be used in designing animal leaches as well. Generally, wherever a ligature is employed, the methods of one-way clutching offer advantage.

What I claim as my invention is:

1. A device for creating a one-way clutching action between a ligature and a frame; said frame comprising of one or more sets of paired holes; in each said sets one hole of said paired holes being named hole1 and the other hole 2; said holes 1 and 2 having diameters approximately equal to the diameter or the width of said ligature; inner edge to inner edge distance between said holes 1 and 2 being approximately equal to the diameter or the width of said ligature; one end of said ligature enters and exits said holes 1 and 2 sequentially forming a ligature loop named loop 1; said ligature end then forms a second loop around an edge of said frame before passing underneath said loop 1; a relative motion between said frame and said ligature being possible only in one direction when tension is applied to said ligature ends; said frame having stepped structure along its boundaries creating a gap between said ligature and said frame; said gap providing space for user's fingers to hold and pull said ligature from underneath said loop 1 for quick release or adjustment;—alternative way to facilitate loosening of the lock formed between said frame and said ligature is to form a complete loop around said loop 1 by passing said ligature end underneath said loop 1 a second time; fastening means secure said complete loop around said loop 1; pulling said complete loop upward unlocks the system.

2. A device for creating a one-way clutching action between a ligature and a frame; said frame comprising of one or more sets of three holes; said three holes in each said sets being named hole1, hole 2 and hole 3; inner edge to inner edge distance between said holes 1 and 2 being approximately equal to the diameter or the width of said ligature; said holes 1 and 2 having diameters approximately equal to the diameter or the width of said ligature; in a preferred practice said holes 1, 2 and 3 form a triangle; one end of said ligature enters and exits said holes 1 and 2 sequentially forming a ligature loop called loop 1; said ligature end then enters and exits said hole 3 before passing underneath said loop 1; a relative motion between said frame and said ligature being possible in one direction when tensile force is applied to said ligature ends; to create a gap between said frame and said ligature, said frame comprises of an opening separating said holes 1 and 2 from said hole 3; alternatively said hole 3 can be set at a higher elevation than said holes 1 and 2 to create a gap; said gap providing a space for user's fingers to hold said ligature to release and to adjust; said frame comprising of symmetric curvature on its boundaries;—alternative way to facilitate loosening of the lock formed between said frame and said ligature is to form a complete loop around said loop 1 by passing said ligature end underneath said loop 1 a second time; fastening means secure said complete loop around said loop 1; pulling said complete loop upward unlocks the system.

3. A ligature-frame assembly of claim 1 or claim 2 in which said frame is a luggage carrier; an auto top luggage carrier; a tent; a tent peg; a swing set; a convertible top; a cargo cover; a belt; a seat belts; a belt buckle.

4. A securing means for pulling opposite sides of a wearable toward each other; said securing means comprising of a ligature and a frame; said wearable having a longitudinal opening with rows of holes alongside said longitudinal opening; said frame having 5 holes; a centrally positioned hole and holes 1, 2, 3, and 4; inner edge to inner edge distance between said hole 1 and hole 2 being approximately equal to the diameter or the width of said ligature; inner edge to inner edge distance between said holes 3 and 4 being approximately equal to the diameter or the width of said ligature; in a preferred practice, said holes 1 and 2 being mirror images of said holes 3 and 4 with respect to said centrally positioned hole; one end of said ligature after criss-crossing through all but the last hole of said wearable on its respective side enters and exits said holes 1 and 2 sequentially forming a loop named loop 1; said ligature end then enters and exits said last hole of said wearable on its respective side before entering and exiting said centrally positioned hole of said frame; said ligature end then passes underneath said loop 1; ligature segment immediately out from under said loop 1 being named pull segment; said ligature end then forms a complete loop around said loop 1 by passing underneath loop 1 for the second time; the other end of said ligature interacts with said holes 3 and 4 in similar fashion; said complete loops formed by said ligature ends are fastened together by fastening means; pulling said pull segments tightens said wearable by forcing the sides of said longitudinal opening closer together; said wearable can be loosened by pulling said fastening means upward.

5. A securing means for pulling opposite sides of a wearable toward each other; said securing means comprising of a ligature and a frame; said wearable having a longitudinal opening; said wearable comprising of rows of holes alongside its longitudinal opening; said frame having 5 holes; a centrally positioned hole and holes 1, 2, 3, and 4; inner edge to inner edge distance between said holes 1 and 2 being approximately equal to the diameter or the width of said ligature; inner edge to inner edge distance between said holes 3 and 4 being approximately equal to the diameter or the width of said ligature; said holes 1 and 2 being a mirror images of said hole 3 and 4 with respect to said centrally positioned hole; one end of said ligature enters and exits said holes 1 and 2 sequentially forming a loop named loop 1; each of said ligature ends then enter and exit a hole on one side of said longitudinal opening of said wearable; said ligature ends then enter and exit corresponding holes alongside the opposite side of said longitudinal opening of said wearable; one end of said ligature then enters and exits said hole 3; the other end of said ligature then enters and exits said hole 4; both said ligature ends then enter said centrally positioned hole before passing underneath said loop 1; said ligature ends then form a complete loop around said loop 1 by passing underneath said loop 1 again; fastening means secure said complete loop around said loop 1; tightening is done by pulling ligature segments from underneath said loop 1; loosening is done by sliding said frame sidewise.

6. A securing means for pulling opposite sides of a wearable toward each other; said securing means comprising of a wearable and ligature; said wearable having a longitudinal opening; said wearable comprising of a row of holes along both sides of said longitudinal opening; each of said rows of holes comprising of at least one set of 3 holes; said 3 holes of each set being named hole 1, hole 2 and hole 3; said 3 holes of each set, in a preferred practice, forming a triangle; inner edge to inner edge distance between said holes 1 and 2 of each set being equal to the diameter or the width of said ligature; one end of said ligature enters and exits holes 1 and 2 of a said set of 3 holes forming a loop named loop 1; said ligature end then enters and exits hole 3 of the same said set before passing underneath said loop 1; said ligature end then forms a complete loop around said loop 1 by passing underneath said loop 1 again; fastening means secure said complete loop around said loop 1; the other end of said ligature interacts the same way with the corresponding set of 3 holes on the opposite side of said longitudinal opening.

7. A ligature ladder comprising of two parallel ligatures; said parallel ligatures being intermediated by sets of bodies; one end of said parallel ligatures being fastened at an elevation; the other end of said parallel ligatures being fastened to the ground level or left hanging free; each of said bodies, in a preferred practice, comprising of 4 holes; two holes being positioned close to one end of said body and the two other holes being positioned close to the opposite end of said body; one of ligature ends enters and exits a hole close to one end of said body; said ligature end then forms a ½ turn loop around said body before entering and exiting from said second hole located at the same end of said body; the other ligature interacts with the other end of said body in the same fashion; other bodies interact with said parallel ligatures in the same fashion; said bodies having free relative motion along said parallel ligatures; locking of said bodies to said parallel ligatures is done by turning said ½ turn loop from one side to the other side over the corresponding end of said bodies; said loop turning locks said bodies to said ligatures in one direction.

8. An ascending/descending device comprised of a pair of ligatures and pair of rigid bodies; said ligatures serve as a pathway; said rigid bodies travel over the length of said ligatures; each of said rigid bodies having a sets centrally located paired holes; one end of said ligatures being fastened to an elevation; the other end of one of said ligature enters and exits one of said centrally located holes of one of said rigid bodies; said ligature end then forms a ½ turn loop around said rigid body before entering and exiting the second centrally located hole of said rigid body; the other said ligature and other said rigid body interact with each other in the similar fashion; when ascending the said ½ turn loops of said ligatures are turned from one side to the other; said loop turning causes a one-way locking between said ligatures and said rigid bodies enabling ascender to pull and push said rigid bodies along said ligatures; when descending, said ½ turn loops are turned back to their original position.

* * * * *